No. 619,161. Patented Feb. 7, 1899.
H. J. GAISMAN.
WAIST BELT.
(Application filed Oct. 30, 1897.)
(No Model.)
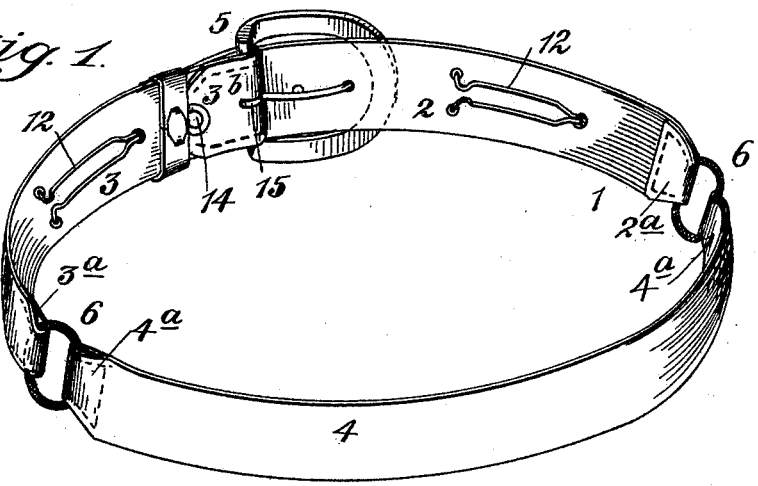
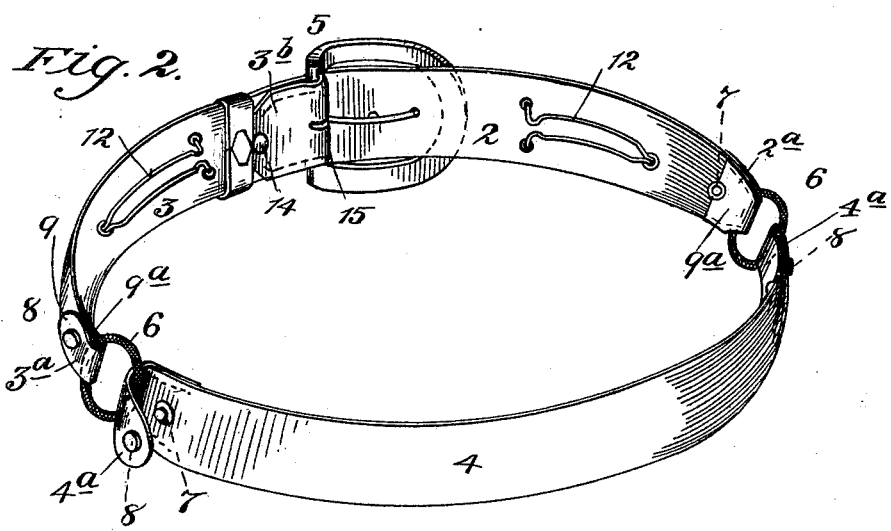
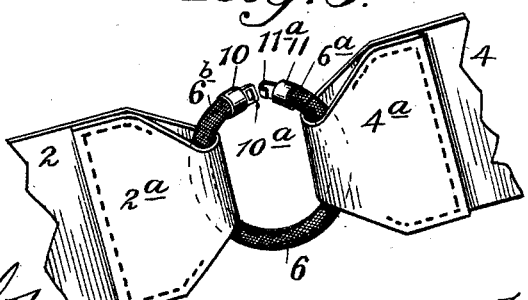
Witnesses
Edward C. Rowland.
F. E. Turner.
Inventor
H. J. Gaisman,
By his Attorney
J. F. Bourne

UNITED STATES PATENT OFFICE.

HENRY J. GAISMAN, OF NEW YORK, N. Y.

WAIST-BELT.

SPECIFICATION forming part of Letters Patent No. 619,161, dated February 7, 1899.

Application filed October 30, 1897. Serial No. 656,897. (No model.)

*To all whom it may concern:*

Be it known that I, HENRY J. GAISMAN, a citizen of the United States, residing in New York city, county and State of New York, have invented certain new and useful Improvements in Waist-Belts, of which the following is a specification.

My invention relates to the class of waist-belts that are composed of a plurality of parts connected together by intermediate rings or the like, usually located at the part of the belt that lies over the hips of the wearer, but in such belts as are known to me the connecting-rings are non-elastic, so that when the main portions of the belt are made of leather or webbing the belt is practically rigid around a waist.

The object of my invention is to provide a belt of the class described with elastic connections between the several parts thereof, so that the belt may expand while around a person's waist.

In carrying out my invention I provide a belt having a plurality of main parts and elastic or expansive connections for said parts of the belt and a suitable buckle or fastening to connect the belt around a waist. The elastic connections I prefer to use are in the form of elastic rings, and while they may be permanently connected with the respective parts of the belt I preferably make them detachable therefrom. For this purpose in the preferred form the ends of the straps composing the belt are provided with complemental fastening devices so arranged that the straps near their ends may be passed through the elastic rings and doubled back and held by the said complemental fastenings.

The invention also consists in the novel details of improvement and the combinations of parts that will be more fully hereinafter set forth and then pointed out in the claims.

Reference is to be had to the accompanying drawings, forming part thereof, wherein—

Figure 1 indicates a belt embodying my invention. Fig. 2 is a similar view showing means for detachably connecting the parts of the belt with the rings, and Fig. 3 is a detail view showing modified means for detachably connecting the ring with the belt.

In the accompanying drawings, in which similar numerals of reference indicate corresponding parts in the several views, 1 indicates generally a belt embodying my invention. The main portions of the belt consist of several strap-like parts 2 3 4, one of which parts carries a buckle or other fastening device 5 for connection with the free end of the belt. The strap 4 is connected at one end to the strap 2, and at its other end the strap 4 is connected to the strap 3 by intermediate elastic or expansible connections 6. In the drawings these expansible connections are in the form of rings, which are preferably made of elastic webbing, such as rubber covered by or woven with threads in well-known manner.

In Fig. 1 the elastics or elastic rings 6 are shown permanently connected to the straps 2 3 4, wherein the corresponding ends $2^a$ $3^a$ $4^a$ of the straps are doubled back through the rings and sewed or gummed to the main part of the strap.

In Fig. 2 the elastic rings 6 are detachably connected with the belt, for which purpose the ends $2^a$ $3^a$ $4^a$ of the straps are not permanently attached to the respective parts of the straps, but are detachably connected therewith, and as a convenient connection for the purpose I have shown complemental button-fastenings, comprising a stud 7 and a socket 8 to receive said stud, which may be in the form of the well-known glove-fasteners. In this case the respective ends of the straps 2 3 4 are passed through the rings 6, folded back from the ring, and secured by the button-fasteners. By this means a person can readily detach an elastic ring 6 from the belt when it has become worn or too much stretched and replace a new one. In this class of belts, particularly leather belts that are provided with a lining of a different color or grade of material from the exposed part of the belt, the free end that is passed through the ring 6 if brought through from the inner side and folded over the outer side of the body of the strap would expose the lining or the unfinished side of the belt. In order to have the end portion of the strap that passes through the ring 6 present the same appearance as the exposed portion of the body of the strap, I provide an independent tongue 9, of suitable shape, preferably having an exposed surface, the same as the exposed surface of the strap, and the inner end of the tongue 9 is secured to the inner surface of the corresponding strap, as at 9ª, so that the tongue 9 when passed through the ring and doubled back over the outer side of the strap will present its finished surface to the outer side. In this class the tongue 9 carries one of the parts of the button-fastener 8 or 7.

The described arrangement of the ends of the straps having folds or bights in which the interposed ring lies and detachable connections for connecting said ends with the body of the straps may of course be used with rings other than elastic rings, such as the well-known metal or leather rings or frames. In either case the arrangement shown provides a convenient means for detachably connecting the several parts of the belt. It will be understood also that while the projecting and folded ends of the straps or their equivalent, the tongues 9, are shown passed through the rings 6 from the inside and folded upon the outer side of the straps 2 3 4 they may be passed through the rings from the outer side and folded over the inner sides of said straps; but where they are arranged as shown in Fig. 2 they serve to embellish the strap.

Other means for detachably connecting the elastic rings with the straps 2 3 4 may be provided than that shown in Fig. 2. Such an arrangement is shown in Fig. 3, wherein the ends 2ª 4ª of the straps 2 4 are folded back and secured to the straps, forming loops in which the elastic ring 6 is located in manner similar to that shown in Fig. 1; but in this case the elastic ring 6 is divided and provided at its ends 6ª 6ᵇ with complemental fasteners adapted to secure the ends of the ring together. For this purpose I have shown ferrules 10 11, secured to the ends of the ring, the one 10 having a slot 10ª to receive a hook 11ª, carried by ferrule 11. With this arrangement the ring 6 may be replaced by disconnecting the parts 10 11 of one ring, removing the ring, inserting a new one in its place, and connecting its ferrules 10 11 together. Such rings may be supplied independently of the belts to enable the users to replace the elastic rings themselves.

While belts of the charcter described may be used without fastenings to attach them to the trousers-bands, I have shown fasteners 12, carried by the straps 2 3, on opposite sides of the buckle 5 in position to engage the buttons on the band of a pair of trousers. As fasteners for this purpose are well known, they need not be further described here.

It is sometimes convenient and desirable to be able to change the buckles on belts, and for this purpose I have shown the buckle 5 as detachably connected with the corresponding strap. For this purpose the end 3ᵇ of strap 3 at the part where it connects with the buckle is not permanently attached to the strap, as is usual when fastening buckles to belts, but is detachably connected therewith, for which purpose the parts 3ᵇ of the strap and the contiguous portion of the strap are provided with complemental fasteners 14, which may be practically the same as those described at 7 and 8, whereby the end 3ᵇ of the strap may be unfastened from the latter, so that the buckle can be removed and a new one attached to the strap. A slot 15 is shown located at the bend or junction of the parts 3 3ᵇ of the strap to receive the tongue of the buckle.

It is evident that any other desired form of buckle attached to a belt by the complemental fasteners may be used instead of the particular construction shown.

While I have shown the belt as provided with three main strap-like parts 2 3 4, it is evident that the belt may be composed of two or more such parts, in which case one of the rings 6 would be dispensed with and the other ring interposed between the two straps where the belt has but two straps. Neither do I limit my invention to the precise details of construction shown and described, as they may be varied without departing from the spirit thereof.

Having now described my invention, what I claim is—

1. A belt composed of a plurality of strap-like parts, an elastic ring connecting the corresponding ends of adjacent parts together, and a fastener for connecting the ends of the belt around a waist, substantially as described.

2. A belt composed of strap-like parts, elastic rings detachably connecting said strap-like parts together, and means for fastening the belt around a waist, substantially as described.

3. A belt composed of a plurality of strap-like parts, a ring or frame interposed between the ends of two straps, the ends of said straps having folds or bights in which the ring lies, and detachable connections for connecting said ends with the body of the strap, substantially as described.

HENRY J. GAISMAN.

Witnesses:
THEODORE BOURNE,
T. F. BOURNE.